June 19, 1973     C. W. CHANCELLOR, JR     3,740,239

SALT IMPREGNATED DEVICE FOR CONTAINERS

Filed May 3, 1971

Charles W. Chancellor, Jr.

INVENTOR.

United States Patent Office 3,740,239
Patented June 19, 1973

3,740,239
SALT IMPREGNATED DEVICE FOR CONTAINERS
Charles W. Chancellor, Jr., P.O. Drawer 15,
Midland, Tex. 79701
Filed May 3, 1971, Ser. No. 139,439
Int. Cl. B65b 3/00
U.S. Cl. 99—171 B
8 Claims

ABSTRACT OF THE DISCLOSURE

A salt impregnated device is provided having a lower surface which is coated with an adhesive, or similar material, for holding the device to the top of a drinking container, such as a beer can, and an upper surface which is coated or impregnated with table salt, or the like, such that the drinker's lips or tongue remove a small amount of salt each time the person takes another drink from the container, thereby supplementing and enhancing the enjoyment of the drink.

---

It is often customary that people use a small amount of table salt, or other taste supplements, with their beer and malt beverages such as to tantalize their taste buds and bring out the full flavor of the beverage. The salt may be shaken directly into the beverage, or it may be taken separately by pouring a small amount into one's hand for licking with the tongue. While such procedures are not difficult to perform, salt shakers are not always available, and often times, the use of such in restaurants and drinking establishments can become bothersome to the proprietors, in that the salt is easily spilled, or otherwise scattered, over the serving area, requiring constant clean-up attention.

It is an object of the present invention to provide a novel salt impregnated device which may be readily attached to the top of a drinking container by way of an adhesive backing, or the like, to provide a convenient source of salt intake for the person as he takes a drink from the container.

Another object of the present invention is to provide a versatile taste supplement impregnated device which is relatively simple and economical to produce, and which may be used as a sales promotional item for beverage manufacturers and their distributors.

It is a further object of the present invention to provide a unique salt impregnated device which is shaped to accommodate drinking containers having a variety of openings therein, and which may be economically produced, such that they may be disposed of along with the drinking container.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
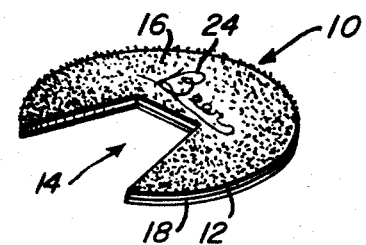
FIG. 1 is a perspective view of the salt impregnated device of the present invention looking downward toward the salt impregnated surface.

Referring now more specifically to FIG. 1, the device of the present invention is generally referred to by the numeral 10, and includes a disc-shaped member 12 which is generally circular in shape with a notch, or cut-away portion 14 removed therefrom. Preferably, disc-shaped member 12 is formed from somewhat rigid paper or cardboard material, or from plastic or thin sheet metal materials, such as will flex sufficiently to conform with the shape of the container top. The top surface of the disc-shaped member is provided with a coating of fine salt crystals 16, such as used for common table salt, or other taste supplement. The coating may be bonded to the disc-shaped member by any one of several conventional adhesives, so long as the adhesive does not ultimately effect the taste of the salt coating. It may be satisfactory to bond the salt coating by first wetting the upper surface of the disc-shaped member, then applying the salt thereto, such that the salt itself becomes wetted and is held in place upon drying. The use of conventional glues or cements may offer a stronger, more satisfactory bond, however.

Figure 2:
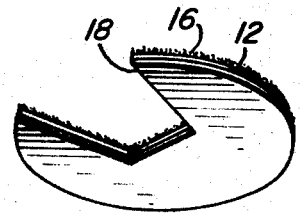
FIG. 2 is a perspective view of the device shown in FIG. 1, but looking upward at the bottom surface thereof.
Figure 4:
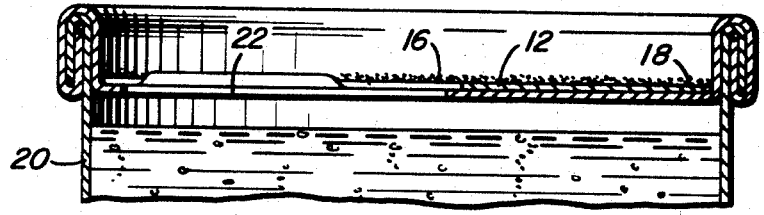
FIG. 4 is a cross-sectional view of the top portion of the container shown in FIG. 3, with the device of the present invention attached thereto.

Referring to FIG. 2, it will be appreciated, that the bottom surface of disc-shaped member 12 is provided with an adhesive coating 18 which is adapted to engage the top of a drinking container. Preferably, the adhesive coating 18 is of the conventional pressure sensitive type which uses a paper backing which is removed prior to using the adhesive surface. Where desired, other adhesives, such as the wettable type, may be utilized.

Figure 3:
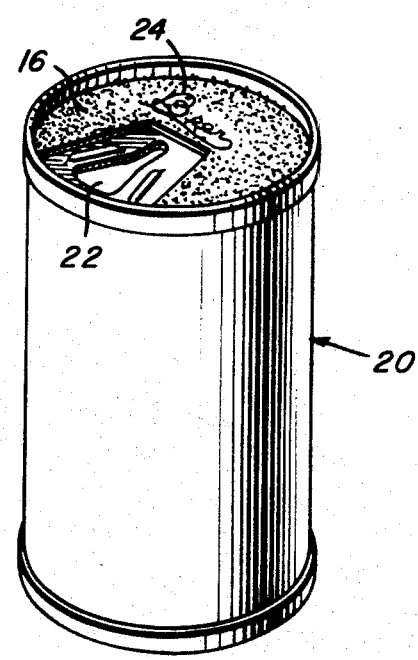
FIG. 3 illustrates a perspective view of the device of the present invention installed in a typical drinking container.

It is appreciated, that the notched or cut-away portion 14 is adapted to accommodate the opening of a drinking container as shown in FIG. 3. The notch is sufficient in size to accommodate the standard snap-top type openers as well as the openings produced by conventional lever-type can openers. The large number of drinking containers used for beers and malt beverages are cylindrical in shape, as that generally referred to by the numeral 20, and include an opening 22 in the top thereof. It can be seen that the disc-shaped member 12 straddles, and partially encompasses opening 22, such that in the process of drinking the beverage from the container salt coating 16 engages the lips of the drinker, such to transfer a small amount of salt thereto. Furthermore, when desired, the person drinking may lick salt coating 16 to obtain additional salt flavor to tantalize his taste buds. After the beverage has been consumed, the salt impregnated device may be disposed of with the drinking container, or may be reused, as desired.

It is appreciated that the device of the present invention is relatively simple in nature and extremely economical to produce, such that it may be manufactured in large numbers to be used as a sales promotional item for beverage manufacturers and their distributors. It should be noted, that while the salt coating covers the disc-shaped member, it is somewhat translucent in nature and therefore, the disc-shaped member may be provided with imprinted matter 24 such as the manufacturers name or trademark, which may be seen through the salt coating. If desired, the device may be attached to the can tops prior to sale or wrapped in a separate container, such as cellophane, for installation by the customer, if he desires.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a beverage container having a substantially flat top portion with a fluid opening therein, a taste supplement device comprising a substantially flat sheet with upper and lower surfaces thereon, a layer of taste supplement bonded to said upper surface of said sheet, an adhesive coating on said bottom surface engaging the top of the container, and a cut-away portion in said sheet closly straddling the fluid opening in the container, such that the lips of a person drinking therefrom will engage said layer of taste supplement when taking a drink therefrom.

2. The combination set forth in claim 1 wherein said upper surface includes indicia imprinted thereon which is visible through said layer of taste supplement to be observed by a person using said device.

3. A taste supplement device for use with drinking container, said device comprising a sheet of relatively thin material having upper and lower surfaces, a layer of taste supplement bonded to said upper surface of said sheet for providing a taste supplement to a person drinking from the container, and means associated with said sheet of relatively thin material for holding said device to the top of the drinking container, said sheet having a notched portion therein along the edge thereof which is adapted to closely straddle and at least partially encompass the opening of the drinking container such that the lips of a person drinking therefrom engage the layer of taste supplement to obtain a taste therefrom.

4. The device set forth in claim 3 wherein said sheet is generally circular in configuration and said notched portion is symmetrical to the center thereof.

5. The device set forth in claim 3 wherein said upper surface of said sheet has indicia imprinted thereon, and said layer of taste supplement is translucent such that said indicia is easily visible to a person using the device.

6. A salt covered device for use with drinking containers, said device comprising a sheet of relatively thin material having upper and lower surfaces, and a layer of salt bonded to said upper surface of said sheet for providing a salt supplement to a person drinking from the container, said lower surface of said sheet having an adhesive coating thereon for holding said device to the top of the drinking container, said sheet having a notched portion therein along the edge thereof which is adapted to closely straddle and partially encompass the opening in the drinking container such that the lips of a person drinking therefrom engage the layer of salt to obtain a small amount of salt therefrom.

7. The device set forth in claim 6 wherein said sheet is generally circular in shape and said notched portion is symmetrical to the center thereof.

8. The device set forth in claim 7 wherein said upper surface of said sheet has indicia imprinted thereon, and said layer of salt is translucent such that said indicia is easily visible to persons using the device.

References Cited

UNITED STATES PATENTS

| | | | |
|---|---|---|---|
| 3,126,284 | 3/1964 | Howerin | 99—77.1 |
| 3,252,803 | 5/1966 | Belasco | 206—47 B X |
| 3,413,128 | 11/1968 | Steinbarth et al. | 99—171 B |
| 2,863,778 | 12/1958 | Lynn | 99—171 R X |
| 2,459,558 | 1/1949 | Villegas de Oribe | 220—90.6 |
| 2,693,685 | 11/1954 | Stafford | 220—90.6 |
| 1,798,339 | 3/1931 | Soulis. | |

TIM R. MILES, Primary Examiner

S. L. WEINSTEIN, Assistant Examiner

U.S. Cl. X.R.

206—47 B; 220—90.2